Nov. 8, 1949   H. M. SMITH   2,487,390
PUMP PISTON
Filed Nov. 22, 1946
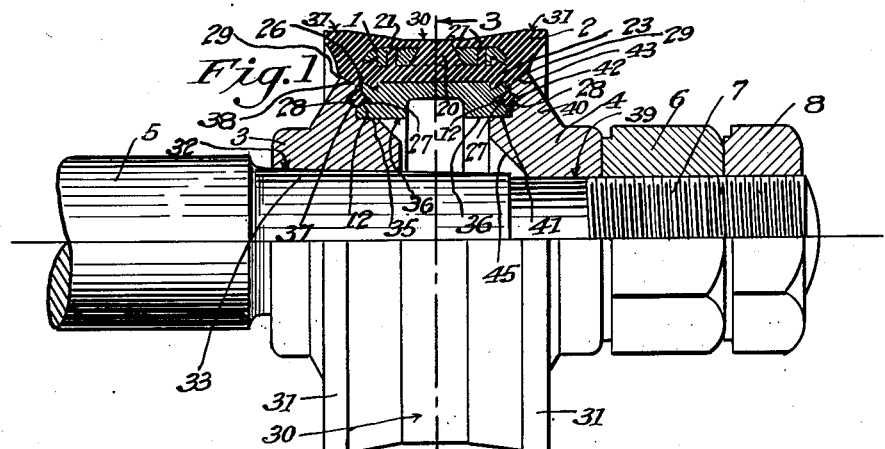
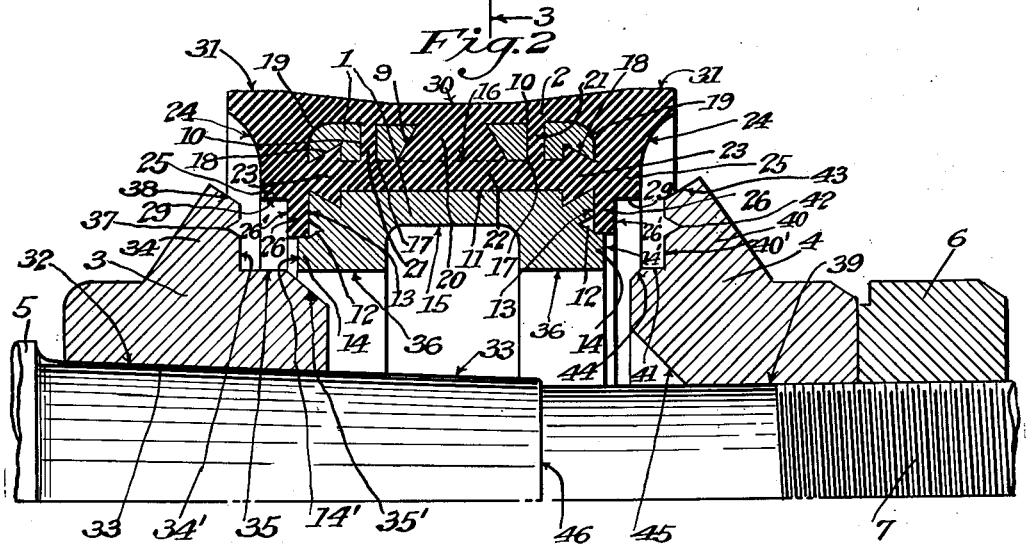
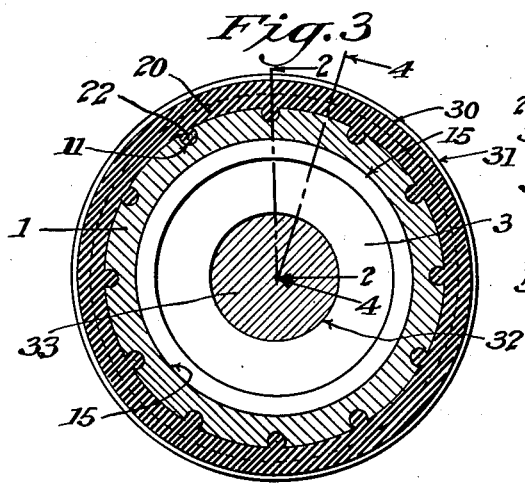
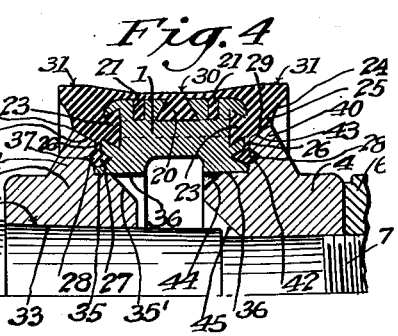
Inventor:
Henry M. Smith,
By Alan Franklin,
Attorney.

Patented Nov. 8, 1949

2,487,390

UNITED STATES PATENT OFFICE 2,487,390

PUMP PISTON

Henry M. Smith, Maywood, Calif.

Application November 22, 1946, Serial No. 711,598

9 Claims. (Cl. 309—4)

This invention relates to pistons, and more particularly to a pump piston, such as used in slush pumps in the oil fields, for pumping any fluid required to be pumped in oil field operations.

The general object of the invention is to provide a pump piston of the character stated, embodying a simplified and improved assembly of parts, which may be easily put together or taken apart, thus reducing labor and saving time in removing and replacing worn or defective parts of the piston.

A more particular object is to provide an improved piston which may be removed from a piston rod and cylinder and replaced in position in the cylinder and on the piston rod without removing the piston rod from the cylinder.

Another object is to provide an expansible and contractible piston, which may be expanded into operative position within a cylinder into sliding sealing contact with the inner surface of the cylinder, or contracted to a diameter smaller than the inner diameter of the cylinder for easy removal of the piston from the cylinder, without removing the piston rod from the cylinder.

A further object is to provide a piston of the character stated which is highly efficient in operation, strong and durable.

Other objects and advantages will appear hereinafter as the description of the invention progresses.

The invention is illustrated in the annexed drawing which forms a part of this specification, and in which:

Fig. 1 a view of my invention partly in side elevation and partly in longitudinal section taken on line 2—2 of Fig. 3, with the piston shown assembled and in its expanded position on a piston rod for operation in a cylinder.

Fig. 2 is a longitudinal section on an enlarged scale of one half of my piston, shown only partly assembled or disassembled on the piston rod, and illustrating how the piston may be placed on piston rod or removed therefrom without removing the piston from the cylinder, said section being taken on line 2—2 of Fig. 3.

Fig. 3 is a cross section of my piston taken on line 3—3 of Fig. 1.

Fig. 4 is a longitudinal section of my piston taken on line 4—4 of Fig. 3.

Referring more particularly to the drawing, in which corresponding parts are designated by the same reference numerals in all of the figures, my piston includes an inner metal piston core ring 1, an outer rubber piston packing ring 2 cast around and partly within said inner ring 1, and a pair of clamp heads 3 and 4 fitted on the forward end of a piston rod 5 for clamping said rings 1 and 2 in position on said piston rod under pressure of a clamp nut 6 threaded on the outer threaded end portion 7 of said end of said piston rod, which clamp nut is locked in clamping position by a lock nut 8 also threaded on said threaded end portion of said piston rod.

The piston core ring 1 is formed in its outer periphery with an annular undercut dove-tail groove 9, a pair of straight annular grooves 10, a plurality transverse key bores 11 spaced circumferentially equi-distant apart around the ring, a pair of V-shaped grooves 12 in the end faces 13 of the ring, a pair of annular end flanges 14 extending outwardly from said end faces at the inner periphery of the ring and inwardly from said V-shaped grooves 12, and an annular groove 15 in the inner periphery of the ring. The annular dove-tail groove 9 is located midway between the end faces 13 of the core ring 1 and the annular grooves 10 are located respectively between the end faces 13, respectively, of the ring and said dove-tail groove 9. The transverse key bores 11 extend transversely through the ring 1 with their outer sides open through the bottom wall of the annular dove-tail groove 9 at 16, and said key bores intersect the annular grooves 10 at the bottom thereof as at 17, while the ends of said key bores are undercut in dove-tail form, as at 18, for the purpose hereinafter described. The outer corner edges 19 of the core ring 1 are rounded. The rubber piston packing ring 2 is cast over and around the piston core ring 1, filling the annular dove-tail groove 9, the annular grooves 10, and the transverse key bores 11, and forming an internal annular dove-tail tongue 20 in said dove-tail annular groove 9, internal annular straight tongues 21 in said annular straight grooves 10, and transverse keys 22 extending through said transverse key bores 11 integral with the inner edges of said annular straight tongues 21 at 17, and formed with dove-tail heads 23 at their ends in the dove-tail ends 18 of said transverse bores 11, with the outer sides of said keys 22 formed integral with the inner side of said dove-tail annular tongue 20 at 16. The ends of the rubber packing ring 2 are concaved, as indicated at 24, and are formed with end internal annular flanges 25 and with thin internal annular extension flanges 26 extending inwardly from the inner edges of said flanges 25, which flanges 25 and 26 cover the ends of the core ring 1 to the outer annular surface of the annular flanges 14 of said core ring 1, the flanges 26 being formed on their inner sides at their inner edges, as hereinafter described, with annular V-shaped tongues 27 fitting in V-shaped annular grooves 12 in the ends, respectively, of the core ring 1. On the outer sides at the inner edges of said extension flanges 26 are also formed V-shaped annular tongues 28 opposite the tongues 27, in the manner and for the purpose hereinafter more fully described. The inner edges of the internal annular flanges 25 of the rubber packing ring 2 form cylindrical internal annular shoulders 29 before the packing ring 2 and the core ring 1 are clamped between the clamp heads 3 and 4 on the piston rod 5, which shoulders extend inwardly from the outer sides of said flanges 25 to the outer sides of the thin annular flanges 26 at the bases of said latter flanges. The outer periphery of the rubber packing ring 2 is concaved transversely at 30 forming annular peripheral high portions 31 at the ends of said packing ring.

The clamp head 3 is formed with a conical axial bore 32 to fit a conical inner end portion 33 of the forward end of the piston rod 5, and said clamp head is formed with an annular external clamp flange 34 and an annular external shoulder 35 at the inner side and at the base of said clamp flange, upon which shoulder is fitted the rear end portion of the inner periphery 36 of the core ring 1, with the inner and forward face 34' of said clamp flange 34 engaging the rear end face 14' of the rear end annular flange 14 of the core ring 1 and the rear side 26' of the thin annular flange 26 at the rear end of the rubber packing ring 2. The annular clamp flange 34 is provided in its inner and forward face with a V-shaped annular groove 37 to receive the V-shaped annular tongue 28 on the rear side of said annular thin flange 26 of the rubber packing ring 2. The outer peripheral edge 38 of the clamp flange 34 of the clamp head 3 is conical, converging forwardly toward the forward inner face of said flange, for engaging the cylindrical shoulder 29 at the rear end of the rubber packing ring 2, in the manner and for the purpose hereinafter more fully described. The forward outer corner of the clamp head 3 is beveled as at 35' so that the inner periphery 36 of the core ring 1 will be guided rearwardly over the annular shoulder 35 of said clamp head 3.

The clamp head 4 is formed with an axial cylindrical bore 39 to slidably fit on the threaded outer end portion 7 of the piston end of the piston rod 5, and said clamp head is formed with an annular external clamp flange 40 and an annular external shoulder 41 at the inner side and at the base of said flange, upon which shoulder is fitted the inner periphery 36 of the core ring 1 at the forward end of said ring, with the rear face 40' of said flange 40 engaging the forward end face 14' of the annular flange 14 and the outer forward side 26' of the thin flange 26 at the outer ends of the rings 1 and 2, respectively. The flange 40 is provided with an annular V-shaped groove 42 to receive the V-shaped annular tongue 28 on the outer side of said thin flange 26. The outer peripheral edge 43 of the clamp flange 40 is conical, converging toward the rear face of said flange for engaging the annular shoulder 29 at the forward end of the rubber piston packing ring 2. The rear corner of the clamp head 4 is beveled at 44 for guiding the forward end of the inner periphery 36 over the annular shoulder 41 of said clamp head 4. The inner corner of the bore 39 of the clamp head 4 is beveled at 45 so that the inner end of said clamp head may extend rearwardly over the forward end 46 of the conical portion 33 of the piston rod 5, which end of said conical portion is of slightly larger diameter than the forward straight portion 7 of said piston rod.

The operation of my invention is as follows:

To assemble my piston on the piston rod 5 while said piston rod is in a cylinder, the clamp head 3 is first slipped over the threaded end portion 7 of the piston rod and onto the conical portion 33 of said rod at the rear of said threaded end portion, until the conical bore 32 of said clamp head fits tightly on said conical portion 33. The metal core ring 1 and rubber piston packing ring 2 cast on said core ring are then slipped over the piston end of the piston rod 5 until the rear end portion of the inner periphery 36 of the core ring 1 is fitted over and upon the annular external shoulder 35 of the clamp head 3. The clamp head 4 is then slipped over the threaded end portion 7 of the piston rod 5 until the inner periphery 36 of the core ring 1 at the forward end of said core ring is fitted over the annular external shoulder 41 of said clamp head 4. The clamp nut 6 is then screwed on the threaded end portion 7 of the piston rod 5, and, upon tightening said nut against the adjacent forward end of the hub of the clamp head 4, the conical peripheral edge 43 of the clamp flange 40 of the clamp head 4 engages the cylindrical internal shoulder 29 at the forward end of the rubber packing ring 2 and the rear side 40' of said clamp flange 40 engages the outer forward side 26' of the internal annular extension flange 26, at the forward end of said piston packing ring, and compresses said flange 26 between said rear side 40' of said clamp flange 40 and the forward end 13 of the core ring 1, until said rear side 40' of said clamp flange 40 abuts against the forward end edge 14' of the flange 14 at the forward end of the core ring 1, whereupon the core ring 1 and piston packing ring 2 are forced rearwardly by said clamp nut 6 and clamp head 4, until the rear side 26' of the internal annular extension flange 26 at the rear end of the packing ring 2 engages the clamp face 34' of the clamp flange 34 of clamp head 3, and said flange 26 is compressed, between said clamp flange 34 and the rear end face 13 of the core ring 1, and the sides of said flange at its inner edge are compressed into the V-shaped grooves 12 and 37 in said end face 13 and in said clamp face 34', respectively, forming the V-shape annular tongues 27 and 28 on the flange 26, which tongues are clamped in said V-shaped grooves 12 and 37, respectively, until the rear end 14' of the flange 14 at the rear end of the core ring 1 abuts against the face 34' of the clamp flange 34, while the conical peripheral edge 38 of said clamp flange 34 of clamp head 3 engages the cylindrical shoulder 29 at the rear end of the rubber piston packing ring 2, and the engagement of the clamp flange conical edges 43 and 38, respectively, of the clamp heads 4 and 3, with the cylindrical shoulders 29 of the rubber packing ring 2 at the forward and rear ends, respectively, of said packing ring, compress said cylindrical shoulders 29, respectively, into conical conformation with said conical clamp flange edges 43 and 38, which presses the flange 25 of the packing ring radially outward until the end portions 31 of the outer periphery of said packing ring firmly engage the inner surface of the cylinder in sealing contact therewith. The lock nut 8 is then threaded on the threaded end 7 of the piston rod against the clamp nut 6, whereby said clamp nut is locked in clamping position with the core ring 1 and packing ring 2 locked in operative position clamped between the clamp heads 3 and 4.

My piston may be removed from the piston rod 5, without removing said rod from the cylinder, by reversing the above described operations in assembling the piston on the piston rod, while in the cylinder; the annular shoulders 29 of the packing ring 2 expanding inwardly from the conical form into cylindrical form and contracting the end flange 25 and the peripheral end portions 31 of the packing ring to a smaller diameter than the inner surface of the cylinder, as the conical edge 43 of the clamp flange 40 of clamp head 4 is withdrawn from the cylindrical shoulder 29 at the forward end of the packing ring, and the cylindrical shoulder 29 at the rear end of the packing ring is withdrawn from the conical peripheral edge 38 of the clamp flange 34 of the clamp head 3. so that the contracted packing ring 2 may be easily withdrawn from the cylinder and the piston rod within the cylinder.

I claim:

1. A piston including a metal annular core, a resilient packing ring surrounding and secured to said core, said packing ring being formed with cylindrical internal shoulders, a pair of clamp heads, each of said clamp heads being formed with an annular external shoulder and an external annular clamp flange formed with a conical peripheral edge, means for securing one of said clamp heads against rearward movement on a piston rod, the other clamp head being freely slidable on said piston rod, said core being slidably fitted on the annular external shoulders of said clamp heads, and means for forcing said freely slidable clamp head rearwardly on said piston rod until the ends of said core are clamped between the clamp flanges of said clamp heads and the cylindrical internal shoulders of said packing ring are engaged by the conical edges of said clamp flanges for pressing the end portions of the periphery of said packing ring into sealing contact with the inner surface of a cylinder.

2. A piston as characterized by claim 1 including means for locking said freely slidable clamp head in clamping position with the core ring and packing ring clamped between the clamp flanges of the clamp heads and the conical peripheral edges of said clamp flanges engaging the cylindrical shoulders of the packing ring and forcing the peripheral end portions of the packing ring into sealing contact with the inner surface of a cylinder.

3. The combination with a cylinder and a piston rod formed at its forward end with a threaded end portion and with a conical portion rearwardly of said threaded end portion of a piston including a core ring and a resilient packing ring surrounding and secured to said core ring, said packing ring being formed at each end with a relatively thick internal annular flange and a relatively thin internal annular flange extending inwardly from said thick flange, and formed with an internal cylindrical shoulder between said flanges, said thick flanges and their integral thin flanges being fitted over the ends, respectively, of said core ring, a pair of clamp heads each of which being formed with an annular external shoulder and with an annular external clamp flange with a conical peripheral edge, one of said clamp heads being fitted tightly on said conical portion of said piston rod against rearward movement thereon, the other clamp head being fitted freely on said threaded end portion of said piston rod, and a clamp nut threaded on said threaded end portion of said piston rod for engaging and forcing said freely fitted clamp head rearwardly on said threaded end of said piston rod until the ends of said core are clamped between the clamp flanges of said clamp heads and said thin flanges of said packing ring are clamped between said clamp flanges and the ends, respectively, of said core ring, while said cylindrical internal shoulders of said packing ring are engaged by the conical edges of said clamp flanges for pressing the end portions of the periphery of said packing ring into sealing contact with the inner surface of said cylinder.

4. The combination as characterized by claim 3 including a lock nut threaded on the threaded end portion of the piston rod for engaging and locking the clamp nut.

5. The combination as characterized by claim 3 in which each of the thin internal flanges of the packing ring, when clamped between the ends, respectively, of the core ring and the clamp flanges of the clamp heads, respectively, is formed on opposite sides thereof with V-shaped annular tongues which are compressed, respectively, into an annular V-shaped annular groove in one end of the core ring and into an annular V-shaped groove in the clamping face of the clamping flange of one of the clamp heads.

6. A piston including a core ring formed in its periphery with an annular undercut groove and with a plurality of key bores extending transversely therethrough in spaced relation around the core ring, with the outer sides of said bores opening into the bottom of said annular undercut groove, a rubber packing ring cast around said core ring in said annular undercut groove and through said key bores forming an annular tongue in said annular groove, and forming transverse keys in said key bores on the inner side of said tongue, a pair of clamp heads for clamping the ends of said core ring and centering said core ring and said packing ring on a piston rod, and interengaging means between said clamp heads and the end portions respectively, of said packing ring for pressing the end peripheral portions of said packing ring into sealing contact with the inner surface of a cylinder.

7. A piston as characterized by claim 6 in which the ends of the key bores in the packing ring are undercut.

8. A piston as characterized by claim 6 in which annular slots are formed in the periphery of the core ring at opposite sides of the annular groove in said core ring which slots intersect the transverse key bores, in which slots the packing ring is also cast.

9. A piston as characterized by claim 6 in which the packing ring is also cast over the ends of the core ring and over the ends of the transverse key bores, joining the end of the keys cast in said key bores.

HENRY M. SMITH.

REFERENCES CITED

The following references are of record in the file of this patent:

UNITED STATES PATENTS

| Number | Name | Date |
|---|---|---|
| 1,955,157 | Wayne | Apr. 17, 1934 |
| 2,144,736 | MacClatchie | Jan. 24, 1939 |
| 2,163,162 | Wells | June 20, 1939 |
| 2,211,454 | Failing et al. | Aug. 13, 1940 |
| 2,277,501 | Murray | Mar. 24, 1942 |
| 2,287,483 | Miller | June 23, 1942 |